Dec. 16, 1924.

H. B. TAYLOR

HYDRAULIC TURBINE

Original Filed July 24, 1917

1,519,173

INVENTOR
Harvey Birchard Taylor
BY Edwards, Sager & Bower
ATTORNEY

Patented Dec. 16, 1924.

1,519,173

UNITED STATES PATENT OFFICE.

HARVEY BIRCHARD TAYLOR, OF PHILADELPHIA, PENNSYLVANIA.

HYDRAULIC TURBINE.

Original application filed July 24, 1917, Serial No. 182,498. Divided and this application filed May 26, 1922. Serial No. 563,811.

*To all whom it may concern:*

Be it known that I, HARVEY BIRCHARD TAYLOR, a citizen of the United States, residing at Philadelphia, in the county of Philadelphia and State of Pennsylvania, have invented certain new and useful Improvements in Hydraulic Turbines, of which the following is a specification.

The principal object of my invention is to provide a new and improved substructure for a hydraulic turbine of the inflow type and particularly to such a turbine having an annular draft tube extending downwardly and outwardly from the turbine runner. Another object of my invention is to provide suitable supporting means for such a turbine and its associated masonry structure. Another object is to make a stay vane ring to go in the draft conduit of such a turbine. Still another object of my invention is to provide columns or piers in the draft conduit beneath such a turbine that shall be effective as supports for the superposed structure and at the same time have the proper disposition as vanes with respect to the water flow in the conduit. These and other objects of my invention will be made apparent in the following disclosure of a specific form in which the invention may be embodied.

Figure 1:
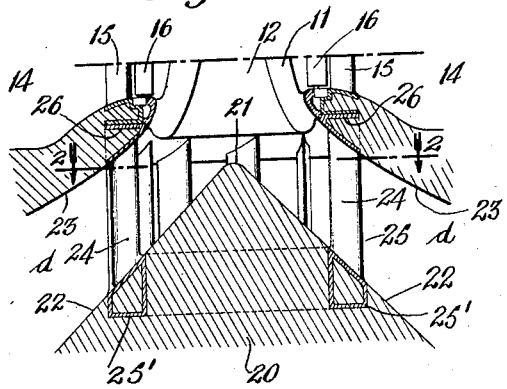
Figure 2:
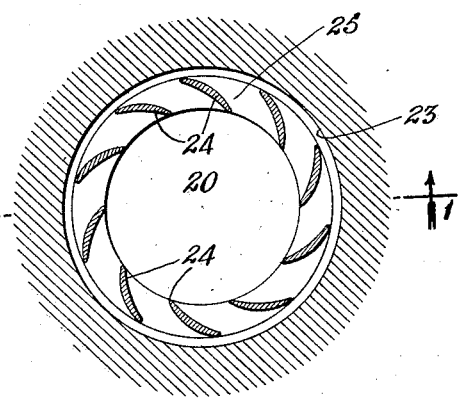

In the accompanying drawings illustrating the invention,

Figs. 1 and 2 are vertical and horizontal sectional views respectively of a turbine structure embodying the invention.

The turbine runner 12 has vanes 11 and is of the vertical shaft type. The supply conduit terminates in a spiral or volute portion 14 surrounding the runner 12. A speed ring 15 is provided directing the flow to the adjustable guide vanes 16 so that the entering flow has a whirl imparted to it around the axis of the runner as a center.

Directly beneath the runner 12 is a central conical core 20 having its apex 21 close to the center of the discharge end of the runner and its surface 22 formed as a surface of revolution inclined for instance at an angle of about 45° to the axis of rotation of the runner. Above this conical base and around it the masonry substructure is formed with the surface of revolution 23 around the runner axis as a center spaced from the surface 22 to provide an annular flaring draft tube $d$ extending downward and outward from the runner discharge. A stay vane ring 25 is provided having stay vanes 24 with base ring 25' in the conical foundation 20 and crown ring 26 in the substructure above and directly supporting the upper speed vane ring 15. These vanes 24 are inclined to radii from the runner axis as shown in Fig. 2 so as to conform to the general whirling shape of the discharge stream from the runner, the passages between these vanes increasing in cross sectional area in the direction of outflow.

The discharge from the runner 12 is received in the draft tube $d$ in a diagonal annular column whirling around the conical core 20 and filling the space between the core surface and the outer surface of revolution 23. The outflow from the runner is thus received in its natural whirling direction and guided between inner and outer surfaces along expanding spiral lines decelerating both meridian and whirling components of the velocity to effect an efficient conversion of velocity head into pressure head and reduce the back pressure on the runner. The stay vanes 24 are close to the runner being spaced therefrom a distance less than the height of one of the stay vanes and by conforming to the natural expanding spiral lines of flow, the stay vanes participate in the diffusing action of the annular space $d$, the passages between the vanes thus acting as diffusers. The stay vane ring 25 also provides a columnar support for the substructure from the foundation below and by diverting the water diagonally outward as shown immediately below the runner, the stay vanes 24 may be arranged in a circle of small diameter immediately below the speed vanes 15 in the intake and these draft tube stay vanes may be of comparatively short length. This construction thus combines compactness with strength and is particularly adapted for installations where the substructure is to be shallow and wide and the flow both as to meridian and whirling components is to be decelerated within a limited space.

I claim:—

1. In a hydraulic turbine the combination with a runner adapted to discharge the flow downwardly and outwardly, of a draft tube having a diagonally extending outward wall around the discharge end of said runner, and a ring of stay vanes extending downwardly from said wall and closely surrounding the discharge end of said runner so as to be spaced therefrom less than the height of one of said stay vanes.

2. In combination, a turbine runner with vertical axis, a masonry foundation structure below the runner having an outflow conduit formed therein, said conduit spreading diagonally downward and outward from said runner and around said axis on every side, and metal stay vanes in said conduit arranged in a series which closely surrounds the runner so as to be spaced therefrom less than the height of one of said stay vanes and supports the upper wall of said conduit on the lower wall thereof, each such stay vane having a shape and position to offer small resistance to the outflowing water.

3. In combination, a turbine runner with vertical axis, a masonry foundation structure below the runner having an outflow conduit formed therein of generally conical formation inclined at substantially 45° to said axis, said conduit spreading diagonally downward and outward from said runner and around said axis on every side, and metal stay vanes in said conduit arranged in a series which closely surrounds the runner so as to be spaced therefrom less than the height of one of said stay vanes and supports the upper wall of said conduit on the lower wall thereof, each such stay vane having a shape and position to offer small resistance to the outflowing water.

4. In combination, a turbine runner with vertical axis, a masonry foundation structure below the runner having an outflow conduit formed therein and comprising an inner deflecting conical core having its surface inclined at substantially 45° to said axis, said conduit spreading diagonally downward and outward from said runner and around said axis on every side, and metal stay vanes in said conduit arranged in a series which closely surrounds the runner so as to be spaced therefrom less than the height of one of said stay vanes and supports the upper wall of said conduit on the lower wall thereof, each such stay vane having a shape and position to offer small resistance to the outflowing water.

5. In combination, a turbine runner with vertical axis, a masonry foundation structure below the runner having a downwardly diverging conical diffusion chamber formed therein between upper and lower surfaces of revolution extending in a generally diagonal direction and gradually diverging from each other so that the distance by which they are spaced apart continually increases, and a stay vane ring with its base engaging the lower wall of said diffusion chamber and its crown engaging and supporting the upper wall thereof, and a speed ring around the runner with its base standing on the crown of said stay vane ring.

6. In combination, a draft tube for a turbine and a single body within and surrounded by said tube, the said body having a curved sectional profile and an unobstructive outer surface, the diameter of said body gradually increasing in the outlet direction, and the inner part of the tube surrounding said body being gradually enlarged in the said direction, and a series of axially extending stay vanes between said inner body and said tube closely surrounding said runner and spaced therefrom a distance less than the height of one of said stay vanes.

HARVEY BIRCHARD TAYLOR.